(No Model.)  6 Sheets—Sheet 1.
T. MUNNELL.
CASH REGISTER.
No. 436,290. Patented Sept. 9, 1890.
FIG. I.
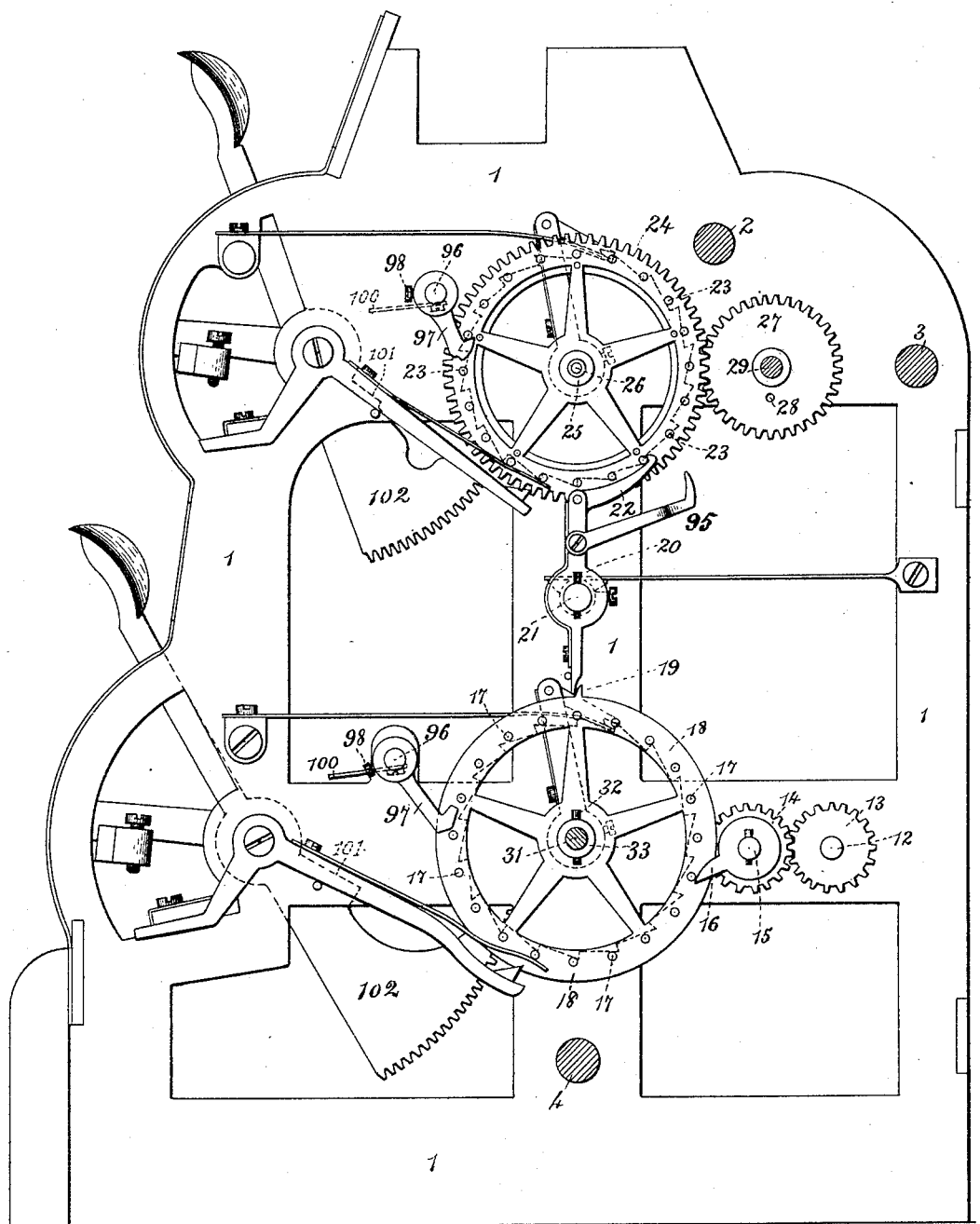
Attest:
Walter Allen
E. Arthur
Inventor:
Thomas Munnell
By Knight Bros.
attys.

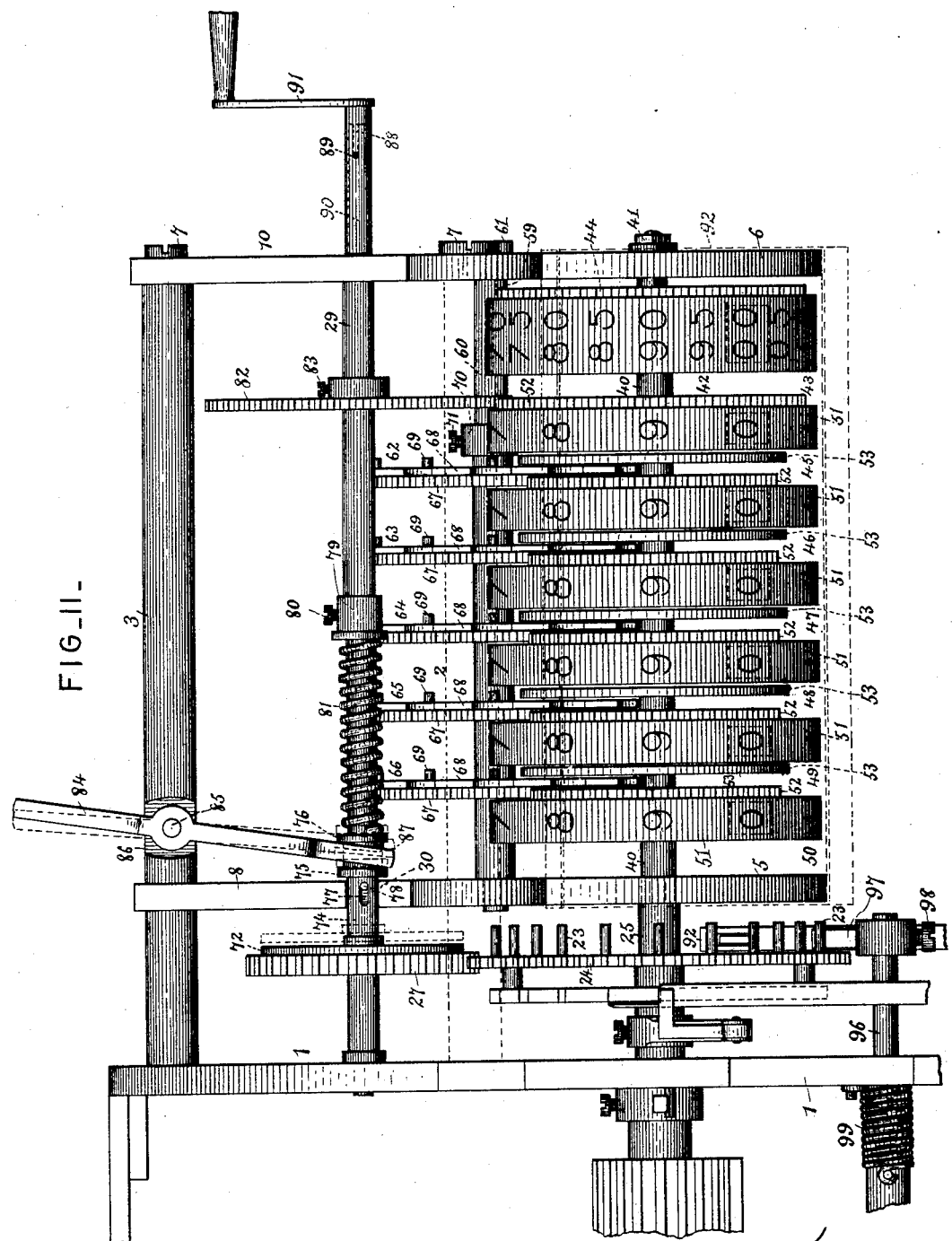

(No Model.)  T. MUNNELL.  6 Sheets—Sheet 3.
CASH REGISTER.
No. 436,290.  Patented Sept. 9, 1890.
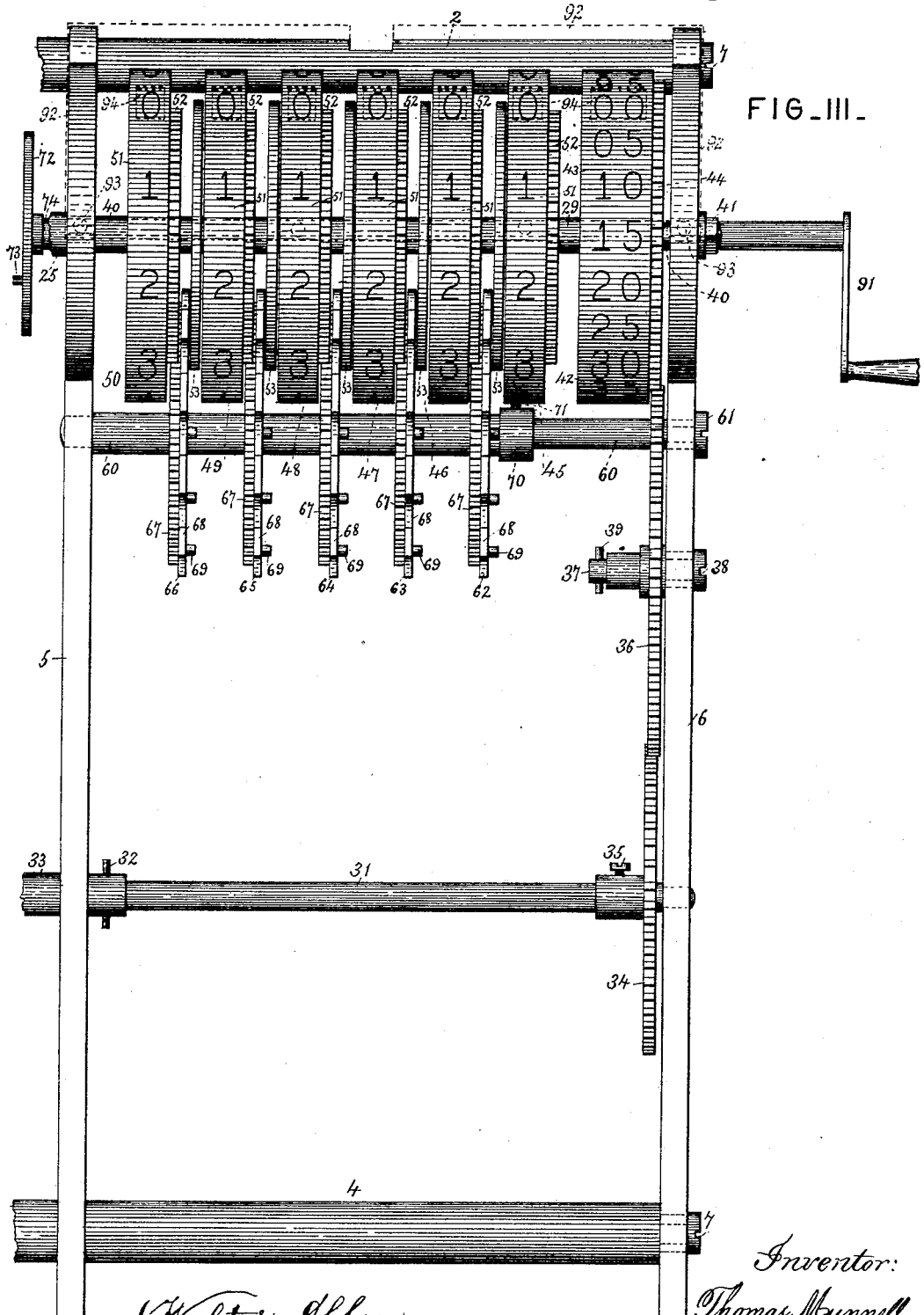
FIG. III.
Attest: Walter Allen, E. Arthur
Inventor: Thomas Munnell
By Knight Bros. attys.

(No Model.) 6 Sheets—Sheet 4.
T. MUNNELL.
CASH REGISTER.
No. 436,290. Patented Sept. 9, 1890.
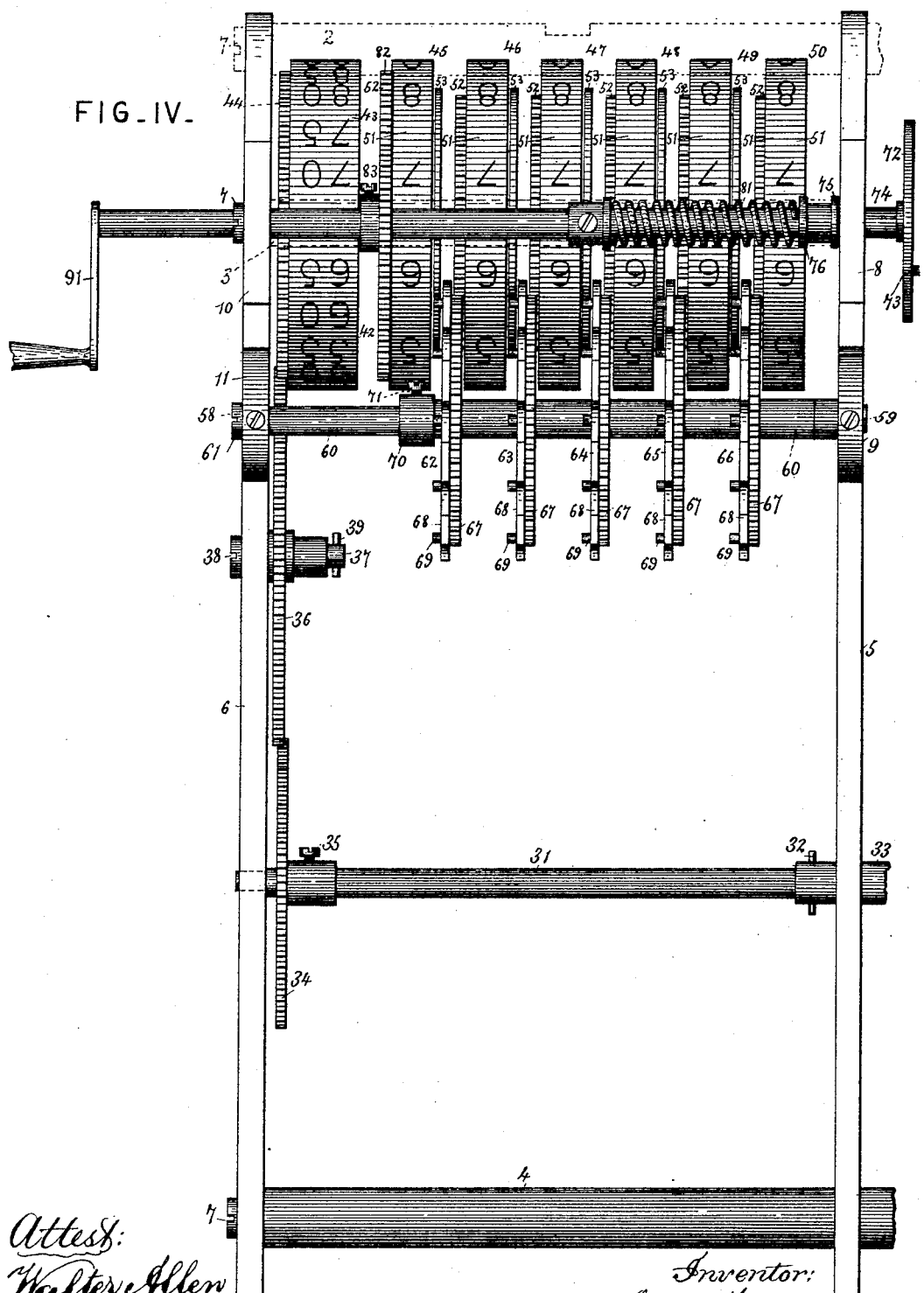
FIG. IV.
Attest:
Walter Allen
E. Arthur
Inventor:
Thomas Munnell
By Knight Bros.
Attys.

(No Model.) 6 Sheets—Sheet 5.
T. MUNNELL.
CASH REGISTER.
No. 436,290. Patented Sept. 9, 1890.
FIG. V.
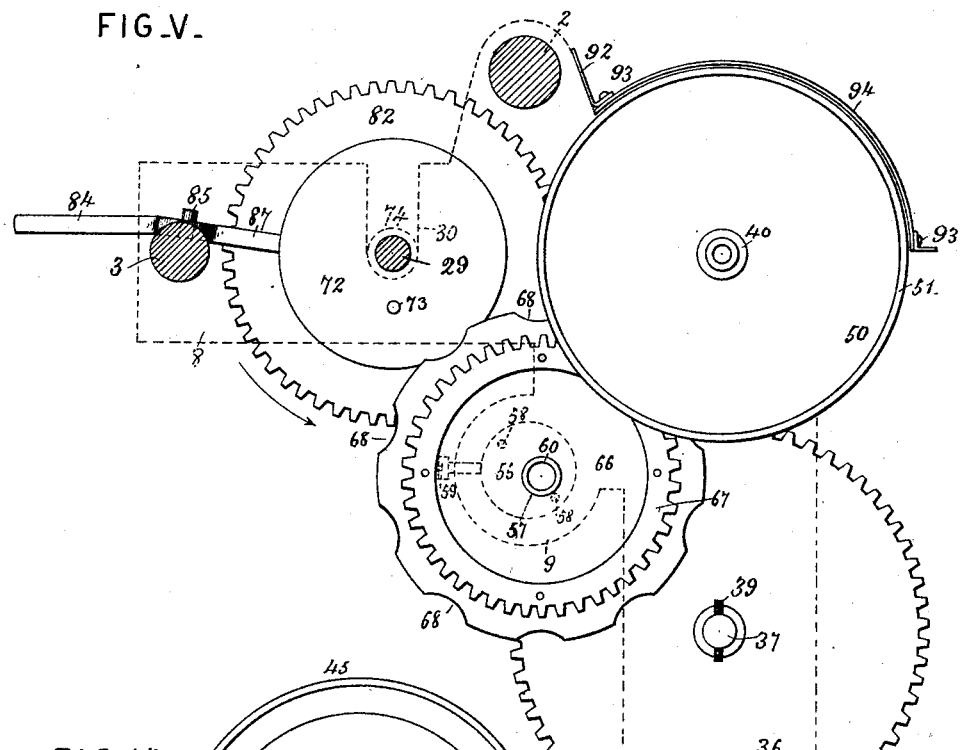
FIG. VI.
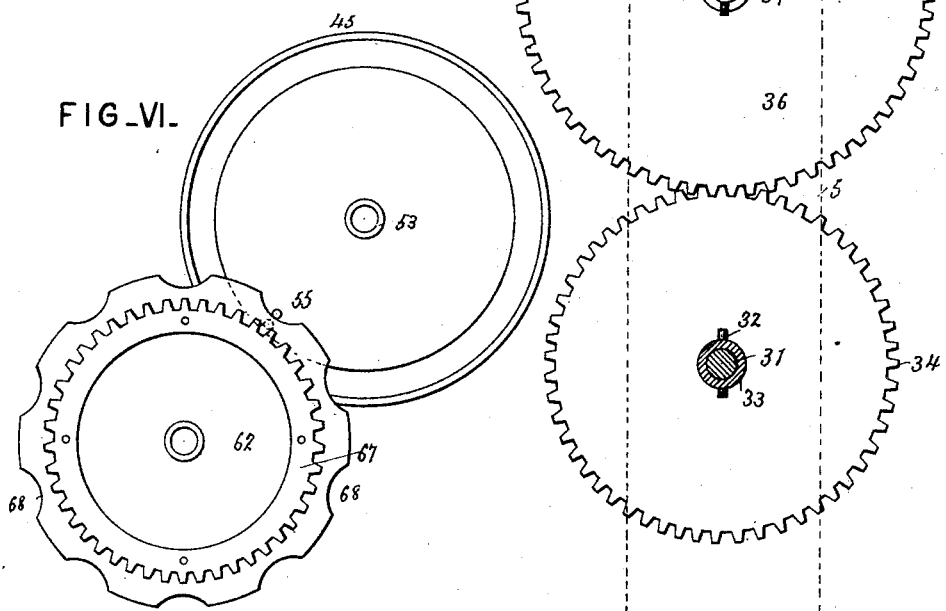
Attest:
Walter Allen
E. Arthur
Inventor:
Thomas Munnell
By Knight Bros
attys

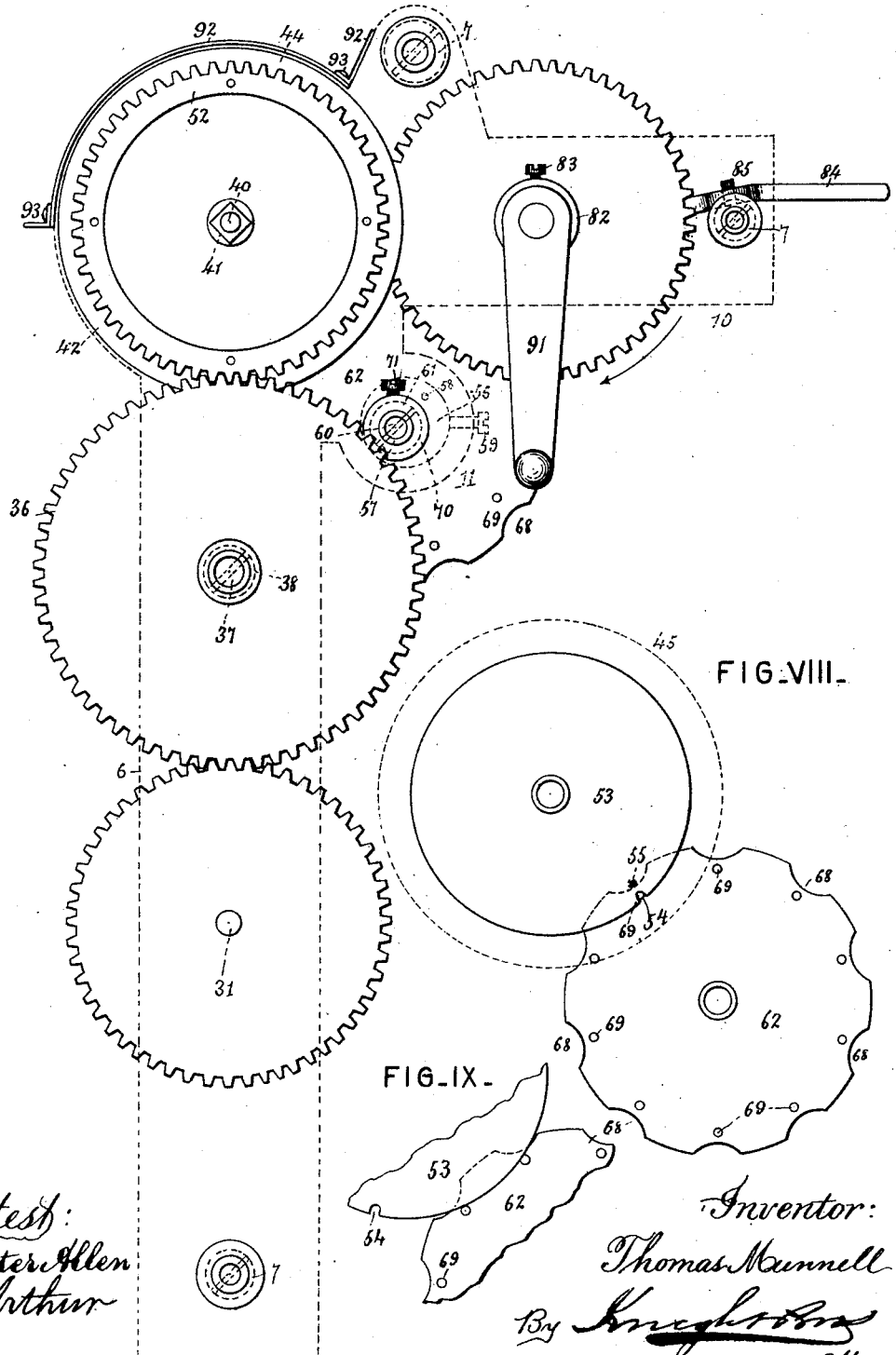

UNITED STATES PATENT OFFICE.

THOMAS MUNNELL, OF MOUNT STERLING, KENTUCKY.

CASH-REGISTER.

SPECIFICATION forming part of Letters Patent No. 436,290, dated September 9, 1890.

Application filed November 5, 1889. Serial No. 329,364. (No model.)

*To all whom it may concern:*

Be it known that I, THOMAS MUNNELL, a citizen of the United States, residing at Mount Sterling, in the county of Montgomery and State of Kentucky, have invented new and useful Improvements in Cash-Registers, of which the following is a specification.

My invention is an improvement on the construction shown, described, and claimed in Letters Patent No. 410,603, dated September 10, 1889, and issued to myself for improvements in cash indicators and registers.

The first part of my invention relates to, is an improvement on, and is intended to form a substitute for, the registering-wheels, dials, and hands of the adding mechanism shown, described, and claimed in said Letters Patent.

The second part of my invention relates to means for controlling the movement of the dollar pin-wheel when operated by the lever-hook.

The third part of my invention relates to means for controlling the movement of a pin-wheel when operated by a key-lever.

My improvements consist in novel features of construction hereinafter described and claimed.

In order that my invention may be fully understood, I will proceed to describe it with reference to the accompanying drawings, in which—

Figure I is an end elevation of one of my cash-registers to which my improved adding mechanism is applied, the adding mechanism being omitted. Fig. II is a top view of the end of the register, showing my adding mechanism connected therewith, the cap being shown in dotted lines. Fig. III is a front elevation of my adding mechanism, the cap being shown in dotted lines. Fig. IV is a rear elevation. Fig. V is a side elevation looking from the register, the frame being shown in dotted lines. Fig. VI is a detail view showing a side elevation of a wheel and disk in unlocking position, so as to turn one point, and looking from the register. Fig. VII is a side elevation looking toward the register, the frame being shown in dotted lines. Fig. VIII is a detail view showing a side elevation of a wheel and disk in unlocking position, so as to turn one point, and looking toward the register. Fig. IX is a detail view showing a side elevation of a wheel or disk in locked position.

1 is an end frame of one of my improved registers, hereinbefore referred to, having rigidly secured thereto, by riveting or otherwise, the horizontal bars 2, 3, and 4, formed with reduced outer ends and sockets in said ends.

5 is an inner bearing-plate fixed to the bars, and 6 is an outer bearing-plate detachably secured to the reduced ends of the bars by the screws 7 entering the sockets. The inner bearing-plate 5 is formed with an arm 8 and a projection 9 beneath the arm. The outer bearing-plate 6 is similarly formed to the inner bearing-plate, with an arm 10 and a projection 11 beneath the arm.

12 is the cent-shaft, carrying therewith a small gear-wheel 13, meshing with a similar gear-wheel 14, mounted on a stud 15, and provided with a finger 16, adapted to engage a pin 17 on the five-cent pin-wheel 18, having a peripheral tooth 19, adapted to strike the lower end of an oscillating or swinging lever 20, mounted loosely on a stud 21 and provided with a pivoted hook 22, adapted to take hold of a pin 23 on the dollar gear pin-wheel 24, which is mounted loosely on a shaft 25, having a reduced end 26.

The gear pin-wheel 24 meshes with a gear-wheel 27, formed with a pin-hole 28 in the web thereof and mounted loosely on a shaft 29, seating in an opening 30 in the horizontal arm 8 and journaled in the end frame 1 and the horizontal arm 10.

31 is a shaft, journaled at its outer end to the outer bearing-plate 6 and secured at its inner end by means of a pin 32 in the hub or sleeve 33 of the five-cent pin-wheel 18. This shaft carries a gear-wheel 34, adjustable thereon at the outer end and secured by a set-screw 35. Above this gear-wheel and meshed thereby is another intermediate gear-wheel 36, mounted loosely on a stud 37, rigidly secured to the outer bearing-plate by means of a screw 38.

39 is a pin, by means of which the gear-wheel is kept to its place on the stud. 40 is a rod supported by the inner and outer bearing-plates, having its inner end recessed and fitting around the reduced outer end 26 of the shaft 25, within the inner bearing-plate 5 and its outer end reduced and passed through the outer bearing-plate 6, where it is secured by a nut 41, bearing against the latter. Mounted loosely on this rod next to the outer bearing-plate is a wheel 42, having a rim 43 and provided with a gear-ring 44 meshed by the gear-wheel 36. On the rim are placed or formed in consecutive order a series of twenty numbers, being the multiples of five from 05 to 100, the first figure 1 in 100 being omitted, as it is transferred to another wheel 45, which forms one of a series of similarly-constructed wheels 45, 46, 47, 48, 49, and 50, mounted loosely on the same rod as the first-named wheel 42.

Each wheel of the series of wheels is constructed with a rim 51, on which are placed or formed in consecutive order a series of numbers 1 to 10, the first figure 1 in 10 being omitted, as it is transferred to the next wheel, 46 for instance. On one side of the wheel is secured a gear-ring 52, and on the other side is attached a disk 53, having a notch 54 in its periphery and an eccentric-pin 55 on the outer face thereof. A description of one of these wheels 45, 46, 47, 48, 49, and 50 is sufficient to describe all of them, as they are all alike, with the exception of the last-named wheel 50, in which the disk is omitted as unnecessary unless additional wheels are employed. Merely six of these wheels are required in this machine.

Adjustable in openings in the projections 9 and 11 of the bearing-plates 5 and 6 are circular plates 56, having eccentric bearings 57, and turned by means of an ordinary key, (not shown,) whose pins enter the holes 58. These circular plates are held to their adjustment by set-screws 59. Mounted in the the eccentric bearings is a rod 60, secured by a screw 61 at its outer end. By means of these eccentric bearings the position of the rod can be adjusted. Turning loosely on this rod are disks 62, 63, 64, 65, and 66. Each disk is constructed with a gear-ring 67, meshed by a gear-ring 52, with recesses 68 in the periphery, with which a pin 55 operates, and with pins 69, which operate in connection with a notch 54. When the eccentric bearings are turned in one direction, the disks are brought into proper engagement with the series of wheels, and when turned in the opposite direction the disks are disengaged from their wheels.

The disks 62, 63, 64, 65, and 66 are unlocked and turned a tenth part of a revolution each time a pin 55 enters a recess 68 and a pin 69 enters a notch 54. At other times the disks are locked from movement by the peripheries of the disks 53 fitting between two adjacent pins on the series of disks 62, 63, 64, 65, and 66. These disks are held from movement endwise of the rod 60 by means of an adjustable collar 70, secured in position by a set-screw 71.

The wheel 45 of the dollar-adding mechanism is connected with the gear-wheel 27 of the operating mechanism by the means now described.

On the shaft 29, contiguous to the gear-wheel 27, is a friction-disk 2, having an eccentric-pin 73, which normally occupies the pin-hole 28 in said gear-wheel. The friction-disk is slidable on the shaft 29, being formed with a sleeve 74, and also with flanges 75 and 76. The sleeve 74 has a slot 77 and pin 78 in connection with the shaft, by which it is limited in its movement on the latter.

79 is a collar adjustable on the shaft and fixed in desired position by means of a set-screw 80. Between this collar and the flange 76 is wound or applied a coil-spring 81, which is provided as a means for keeping the friction-disk against the gear-wheel. For regulating the tension of the spring the collar 79 is adjusted along the shaft.

82 is a gear-wheel adjustably secured on the shaft 29 by means of a set-screw 83, and meshing with the gear-ring 52 on the wheel 45. The dollar-adding mechanism is disconnected from the gear-wheel 27 of the operating mechanism by means of a hand-lever 84, fulcrumed on a stud 85, secured in a recess 86, formed in the horizontal bar 3. This lever has a forked inner end 87, embracing the sleeve 74 between the flanges 75 and 76, so that when the lever is moved to the position shown in dotted lines in Fig. II the friction-disk 72 and its pin 73 will be separated from the gear-wheel 27 until the lever is released. Should the gear-wheel 27 or friction-disk 72 be turned from the normal position shown, the pin 73 will bear on the outer face of the gear-wheel until the pin and pin-hole register, or vice versa, when the pin will spring into place.

The outer end of the shaft 29, where it projects beyond the outer bearing-plate is formed with a slit 88 for the insertion of a cross-pin 89, located in a socket 90 in a crank-handle or key 91, by which the shaft is rotated when free to turn.

92 is a cap-plate secured by fastenings 93 to the bearing-plates 5 and 6, and having openings 94, through which the figures of the amounts registered can be read.

In order to prevent the gear pin-wheel 24 turning too far when operated by the hook 21, I provide an auxiliary hook 95, which is secured to the swinging lever 20, and assumes the normal position of the advance hook when the latter is moved forward; also, to prevent the rebound of the long shafts of the register after each key-lever flies up, (which is liable to produce additional registration,) I provide rock-shafts 96, carrying pendent arms 97, adjustably secured by set-screws 98, and held in normal position by springs 99, coiled around the rock-shafts and secured at one end to the end frame 1 and at the other end to the rock-shafts. The rock-shafts are provided with free or leaf springs 100, against which projections 101 on the key-levers 102 bear when the key-levers are operated. The ends of the arms 97, when in normal position, rest against the pins in advance thereof, preventing the rearward movement of the pin-wheels; but when the key-levers are operated the ends of the arms are withdrawn from between the pins by the projections 101 striking the springs.

To arrange the parts of the register in position for operation, the rear side of the finger 16 on the small gear-wheel 14 is placed in close proximity to a pin 17 on the five-cent pin-wheel 18, the rear side of the peripheral tooth 19 on the latter wheel being contiguous to the lower end of the swinging lever 20. The adding-wheels will be placed on the rod 40, with their ciphers showing through the openings 94, the dollar-wheels being in such a position as to have their pins 55 located in the recesses 68 of the disks.

To operate the register, the key-levers are depressed, as usual. To register the receipt of a cent, the shaft 12 is turned one-fifth of a complete rotation. This action will impart the same movement to the gear-wheels 13 and 14 and to the finger 16. When four more cents are registered, these parts will each have had a complete rotation, causing the finger to engage a pin 17 on the pin-wheel 18 and turn the latter one-twentieth part of a complete rotation, and consequently the shaft 31, the gear-wheel 34, and wheel 42 will have the same movement, so that the number 05 will appear at the opening where the receipt of five cents is registered. Now if it is desired to register the receipt of five cents the pin-wheel 18 is turned one-twentieth of a complete rotation, a pin 17 slipping past the finger 16, and the number 10 will appear at the said opening. To register ninety cents in addition, the rotation of the pin-wheel 18 will be completed, and at the end of its movement the peripheral tooth 19 will strike the lower end of the swinging lever 20 and cause its hook 21 to engage a pin 23 on the gear pin-wheel 24 and impart a one-twentieth of a complete rotation to the latter. At the same time the wheel 42 will show 00 at its opening. The movement of the gear pin-wheel 24 rotates the gear-wheel 27, shaft 29, and gear-wheel 82 sufficiently to impart a one-tenth of a complete rotation to the unit dollar-wheel 45, so that the number 1 will appear at the opening of the latter, showing that one dollar had been received. If it is now desired to register nine dollars, the rotation of the gear pin-wheel 24 is continued nine-twentieths of a complete rotation. The unit dollar-wheel will now have been turned nine-tenths more and show the figure 0 at its opening, and its pin 55 having pressed on the side of a recess 68 of the disk 62, and the pin 69 of the latter having entered the notch 54 of the wheel-disk, the ten-dollar wheel has been moved one-tenth of a complete rotation, and shows its figure 1 at its opening. The total receipt of ten dollars is therefore exhibited. A complete rotation of the ten-dollar wheel will impart a tenth part of a rotation to the hundred-dollar wheel, and so on through the series of dollar-wheels. To reverse the dollar-wheels for resetting, the operator stands in front of the register and presses the lever 84 to the left to the position shown in dotted lines in Fig. II. The crank-handle 91 is then applied and turned in the direction shown by the arrow in Fig. VII until zero appears on the adding-wheels. Then release the lever and turn the crank-handle until the spring 81 causes the pin 73 to enter the pin-hole 28. Finally work the proper key-lever to bring all the adding-wheels to zero.

Having thus described my invention, the following is what I claim as new therein and desire to secure by Letters Patent:

1. The combination of a cent-shaft 12, provided with a small gear-wheel 13, the stud 15, provided with a small gear-wheel 14 and a finger 16, the five-cent wheel 18, having pins 17, the shaft 31, having its inner end locked to and turning with the five-cent wheel, the gear-wheel 34, fixed on the outer end of the shaft 31, the intermediate gear-wheel 36, located over and meshed by the gear-wheel 34, and the adding-wheel 42, located over the intermediate gear-wheel, constructed with a gear-ring 44, meshed by the intermediate gear-wheel and with a rim 43, having a series of twenty numbers in consecutive order thereon, the said numbers being "05" and the multiples of five from "05" to "00," substantially as described.

2. The combination of a five-cent wheel 18, having pins 17, the shaft 31, having its inner end locked to and turning with the five-cent wheel, the gear-wheel 34, fixed on the outer end of the shaft, the intermediate gear-wheel 36, located over and meshed by the gear-wheel 34, and the adding-wheel 42, located over the intermediate gear-wheel, constructed with a gear-ring 44, meshed by the intermediate gear-wheel, and with a rim 43, having a series of twenty numbers in consecutive order thereon, the said numbers being "05" and the multiples of five from "05" to "00," substantially as described.

3. The combination of a five-cent wheel 18, formed with a peripheral tooth 19, the swinging lever 20, having a hook 22, the dollar-gear pin-wheel 24, the gear-wheel 27, meshed by the gear pin-wheel, the shaft 29, having gear-wheel 82 thereon, means for connecting the shaft with the gear-wheel 27 so as to turn with the latter, the rod 40, and the wheel 45 on the rod, and constructed with a gear-ring 52, meshed by the gear-wheel 82, and with a rim 51, having a series of ten numbers in consecutive order thereon, the said numbers being "1" to "0," substantially as described.

4. The combination of a dollar gear-wheel 24, the gear-wheel 27, meshed by the dollar gear-wheel, the shaft 29, having gear-wheel 82 thereon, means for connecting the shaft with the gear-wheel 27 so as to turn with the latter, the rod 40, and the wheel 45 on the rod and constructed with a gear-ring 52 meshed by the gear-wheel 82, and with a rim 51, having a series of ten numbers in consecutive order thereon, the said numbers being "1" to "0," substantially as described.

5. The combination of the dollar gear-wheel 24, the shaft 29, the gear-wheel 27, mounted loosely on the inner end of the shaft, having an eccentric pin-hole 28 and meshed by the dollar gear-wheel, the gear-wheel 82 on the shaft, the collar 79 on the shaft, the sliding-sleeve 74 on the shaft having pin-and-slot connection with the latter, and constructed with a friction-disk 72, having an eccentric-pin 73, adapted to engage the pin-hole, and with flanges 75 and 76, the coil-spring 81, surrounding the shaft between the collar and the outer flange, the wheel 45, having gear-ring 52 and rim 41, the hand-lever 84, having forked inner end working between the flanges for disconnecting the disk-pin, and a key for turning the shaft for resetting the wheel 45 while the hand-lever is held, substantially as described.

6. The combination of the wheel 45, provided with a disk 53, having a notch 54 and a pin 55, and the disk 62, having pins 69 and recesses 68, substantially as described.

7. The combination of the wheel 45, provided with a disk 53, having a notch 54 and a pin 55, and the disk 62, having pins 69, recesses 68, and gear-ring 67, substantially as described.

8. The combination of the adding-wheel 45, formed with a rim 51 a gear-ring 52, and a disk 53, having a notch 54, and a pin 55, and the disk 62, having pins 69, recesses 68, and gear-ring 67, substantially as described.

9. The combination of the shaft 29, having a gear-wheel 82 fixed thereto, the adding-wheel 45, formed with a rim 51, a gear-ring 52, and a disk 53, having a notch 54 and a pin 55, and the disk 62, having pins 69, peripheral recesses 68, and gear-ring 67, substantially as described.

10. The combination of the adding-wheel 45, formed with a rim 51 and a disk 53, having a notch 54 and a pin 55, the disk 62, having pins 69, peripheral recesses 68 and gear-ring 67, and the adding-wheel 46, having a gear-ring 52, substantially as described.

11. The combination of the circular plates 56, having eccentric bearings 57, the rod 60, mounted in said bearings, the wheel 45, provided with a disk 53, having a notch 54 and a pin 55, and the disk 62, having pins 69 and recesses 68, substantially as described.

12. The combination, with the swinging lever having a hook and the wheels connected thereby, of the auxiliary hook 95, secured to the swinging lever, substantially as described.

13. The combination, with the five-cent wheel and the dollar pin-wheel, of the swinging lever 20, having a hook 22 and auxiliary hook 95, substantially as described.

14. The combination of a pin-wheel, the rock-shaft 96, the spring 99 for holding the rock-shaft in normal position, the pendent arm 97, secured to the rock-shaft, having its outer end occupying a position between two pins on the pin-wheel, the leaf-spring 100, extending horizontally from the rock-shaft toward the front of the machine, and a key-lever 102 for operating the pin-wheel, having a projection 101 on its upper edge adapted to bear on the free end of the leaf-spring to turn the rock-shaft and withdraw the outer end of the arm from between the pins, substantially as described.

THOMAS MUNNELL.

Witnesses:
S. B. HAMMEL,
JOSIE OBERLE.